United States Patent [19]

Miller

[11] 3,888,966
[45] June 10, 1975

[54] ENHANCED COBALT RECOVERY FROM AMMONIACALLY LEACHED REDUCED ORES USING CYANIDE, HYDRAZINE, OR HYDROXYLAMINE COMPOUNDS

[75] Inventor: David James Miller, Gretna, La.

[73] Assignee: Freeport Minerals Company, New York, N.Y.

[22] Filed: June 2, 1972

[21] Appl. No.: 259,081

[52] U.S. Cl. .................... 423/150; 75/103; 75/119
[51] Int. Cl. ........................................... C01g 51/12
[58] Field of Search .......... 423/143, 144, 150, 407; 75/103, 119, 106

[56] References Cited
UNITED STATES PATENTS

| | | | |
|---|---|---|---|
| 911,254 | 2/1909 | Mosher | 75/103 |
| 1,164,141 | 12/1915 | Sulzberger | 75/119 |
| 2,621,107 | 12/1952 | Dean et al. | 423/50 |
| 2,711,956 | 6/1955 | Schaufelberger | 423/144 X |
| 2,902,345 | 9/1959 | Hyde et al. | 423/144 X |
| 2,928,732 | 3/1960 | Barc et al. | 75/103 |
| 3,141,765 | 7/1964 | Brown et al. | 75/119 |
| 3,272,738 | 9/1966 | Pitzer | 423/143 |
| 3,347,662 | 10/1967 | Snyder | 75/117 |
| 3,403,020 | 9/1968 | Lower | 75/106 |
| 3,437,476 | 4/1969 | Dotson et al. | 75/121 |
| 3,684,491 | 8/1972 | Coffield et al. | 75/103 |
| 3,753,686 | 8/1973 | Wilder | 75/119 |
| R24,369 | 10/1957 | Dougherty | 75/119 |

FOREIGN PATENTS OR APPLICATIONS

| | | | |
|---|---|---|---|
| 43,343 | 1/1938 | Netherlands | 75/103 |

OTHER PUBLICATIONS

Cotton, F. A. et al.; Advanced Inorganic Chemistry 2nd Ed. Interscience, N.Y. N.Y., (1967), pp. 311–313, 335–336, 340–341, 754–755.
Audrieth et al. "Chemistry of Hydrazine" J. Wiley and Sons Inc. New York, 1951, (pp. 115, 116, 123) (Q.D. 181 N15AS Scient. Library).

Primary Examiner—Edward J. Meros
Assistant Examiner—Brian E. Hearn
Attorney, Agent, or Firm—Lawrence W. Flynn

[57] ABSTRACT

In an ammoniacal leaching process for the recovery of non-ferrous metals, the slurry of reduced ore and ammoniacal solution in the leaching-washing circuit is treated with nitrogenous compounds selected from the group consisting of hydrazine and soluble salts thereof, hydroxylamine and soluble salts thereof, hydrogen cyanide and soluble cyanide salts. These compounds enhance the solubilization of ore cobalt values into the liquid phase of the slurry, thereby enabling the recovery of additional amounts of cobalt which would otherwise be lost with the ore tailings.

8 Claims, 1 Drawing Figure

PATENTED JUN 10 1975 3,888,966
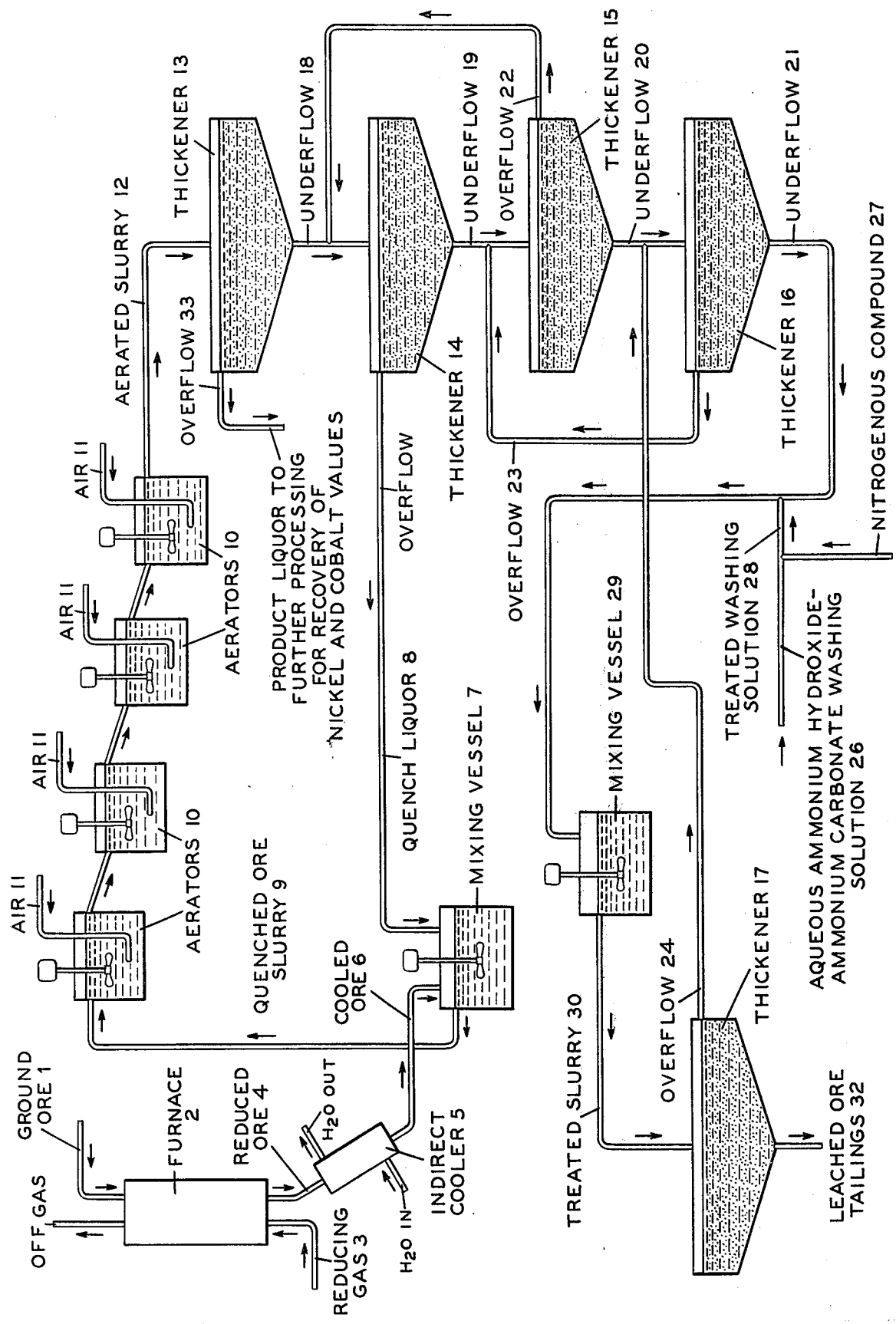

ENHANCED COBALT RECOVERY FROM AMMONIACALLY LEACHED REDUCED ORES USING CYANIDE, HYDRAZINE, OR HYDROXYLAMINE COMPOUNDS

BACKGROUND OF THE INVENTION

This invention relates to a method for significantly improving the recovery of cobalt values from reduced nickeliferous ores using an ammoniacal leaching process.

This invention further relates to a novel composition of matter which is a useful intermediate in the recovery of cobalt from reduced nickeliferous ores and which is characterized by a cobalt content in the ore portion which is substantially lower than that normally obtained in an ammoniacal leaching process.

In recovering the valuable nickel and cobalt values from ores containing these metals, processes are known in which the ores are first reduced at high temperatures by reducing gases and then cooled in a non-oxidizing atmosphere. The cooled ores are then subjected to a leaching-washing step in which the reduced ores are first leached with an ammoniacal solution in the presence of oxygen or an oxygen-containing gas such as air, and then washed in a countercurrent washing circuit with an aqueous ammoniacal solution. As can be seen, when the reduced ore is in contact with the ammoniacal solution, there is formed a slurry in which the ore forms the solid phase and the solution the liquid phase. Part of the washing operation entails the separation of this solid phase from the liquid phase containing the recoverable metals, and for this purpose a series of thickeners is normally used. In most cases, the ammoniacal solution is an aqueous ammonium hydroxide which often also contains ammonium carbonate. Examples of such prior art processes are described in U.S. Pat. Nos. 1,487,145 and 3,100,700 and "The Winning of Nickel," J. R. Boldt, Jr., Van Nostrand Co., Inc., Princeton, N.J., pp. 425–437.

The leaching-washing circuit of these processes yields a pregnant ammoniacal solution containing dissolved nickel and cobalt values, and a slurry of leached ore tailings containing the remainder of the reduced ore. The pregnant solution, normally called the "product liquor," may be further processed to separate and recover from it the dissolved metals in accordance with known procedures. While these processes provide good nickel recoveries (usually between 75% and 95%), the cobalt recoveries are poor (usually between 30% and 50%). The reason for this is that substantial amounts of cobalt remain associated with the solid phase of the slurry, and are eventually lost when this solid phase is discharged to waste with the leached ore tailings of the process.

A known prior art process for enhancing cobalt recoveries is described in U.S. Pat. No. 2,928,732. In this process, sulfite ion is supplied to the slurry of reduced ore and ammoniacal solution. In the preferred embodiment, the slurry is treated with sulfur dioxide.

It is a general object of this invention to provide a novel method for significantly enhancing the recovery of the cobalt values from the ore solids in the leaching-washing circuit of a conventional ammoniacal leaching process by the use of selected nitrogenous compounds.

It is another object of this invention to provide a method which relies on the use of nitrogenous compounds for significantly increasing the cobalt content of the liquid phase of the slurry of reduced ore and ammoniacal solution produced in an ammoniacol leaching process, while simultaneously reducing the cobalt content of the solid phase of the slurry.

It is another object of this invention to provide a method for the recovery of nickel and cobalt from nickeliferous ores using nitrogenous compounds which is characterized by significantly better cobalt recoveries than those obtainable from conventional ammoniacal leaching processes.

It is a further object of this invention to provide a new composition of matter containing selected nitrogenous compounds which is further characterized by an enhanced solubilized cobalt content and lowered unsolubilized cobalt content, said composition being a useful intermediate in the recovery of cobalt from nickeliferous ores by chemical reduction and ammoniacal leaching techniques.

It is a further object of this invention to provide a new composition of matter containing selected nitrogenous compounds from which said cobalt values can be conveniently recovered in significantly increased amounts.

It is a still further object of this invention to provide a method which relies on the use of nitrogenous compounds for recovering cobalt values present in the leached ore tailings generated in a conventional ammoniacal leaching process which otherwise would be lost when the tailings were discharged to waste.

These and other objects of this invention will be apparent to those skilled in the art from a consideration of this total disclosure.

SUMMARY OF THE INVENTION

The above objectives are accomplished in accordance with this invention by introducing into, or otherwise providing in, the slurry formed by the reduced ore and aqueous ammoniacal solution in an ammoniacal leaching process of the type previously described, one or more nitrogenous compounds selected from the group consisting of hydrazine, a soluble salt of hydrazine, hydroxylamine, a soluble salt of hydroxylamine, hydrogen cyanide and a soluble salt of a cyanide. The nitrogenous compound is provided in an amount which is effective to enhance the solubility of the cobalt values of the ore in the ammoniacal solution which forms the liquid phase of the slurry.

The compound can be introduced at any state in processing which will insure its presence in the slurry at some point during the leaching or washing operation. It has been found that the presence of the nitrogenous compound in the slurry at any stage of the leaching or washing circuit in such processes causes the distribution of cobalt between the solid and liquid phases of the slurry to markedly change in favor of the liquid phase. This produces a significantly higher cobalt concentration in the liquid phase, which is the source of recovered cobalt, as compared to other processes that do not employ the nitrogenous compounds.

Upon the introduction of the nitrogenous compounds into said slurry, in the manner described above, a new and useful composition of matter is produced which is characterized by the dissolution into the liquid phase of a fraction of the cobalt values originally associated with the ore solids, said fraction being substantially larger, e.g., 15% or more, than that normally dissolved into the liquid phase of slurries produced by conventional ammoniacal leaching processes not employing the nitrogenous compounds of this invention. The dissolution of such a larger fraction of cobalt values in the liquid phase of the slurry results in an enhanced solubilized cobalt content, which makes the novel composition of this invention a useful intermediate in the cobalt recovery process, and directly responsible for the higher cobalt recoveries obtainable from such processes.

BRIEF DESCRIPTION OF THE DRAWING

The drawing is a schematic flowsheet illustrating a preferred embodiment of the method of this invention.

DESCRIPTION OF THE PREFERRED EMBODIMENTS

The ammoniacal slurry treated in accordance with the method of the present invention results, as is known, from the quenching of reduced nickeliferous ores with an ammoniacal leach liquor. Illustratively, this slurry comprises from about 5% to 60% by weight of a solid phase in the form of finely divided reduced ore, and from about 40% to 95% of a liquid phase comprising an aqueous solution illustratively containing from about 1 to 160 grams per liter of ammonium hydroxide, expressed as $NH_3$, and having a pH higher than 7. In addition to ammonium hydroxide, the liquid phase of the slurry contains dissolved nickel and cobalt in various concentrations, depending on the particular stage of the leaching-washing circuit where the treatment occurs, and on the original nickel and cobalt contents of the ore being processed. The liquid phase may also optionally contain ammonium carbonate in amounts illustratively ranging from as little as about 1 to as much as about 350 grams per liter, expressed as $(NH_4)_2CO_3$. The pH of the liquid phase of the slurry must be higher than 7, or else must be raised to at least 7 before the method of the present invention is applied. A common technique for raising the pH of the liquid phase is by the addition of ammonium hydroxide or ammonium carbonate.

In accordance with the present invention, there is provided in such an ammoniacal slurry a nitrogenous compound such as hydrazine or a soluble salt of hydrazine, hydroxylamine or a soluble salt of hydroxylamine, hydrogen cyanide or a soluble cyanide salt. The compound can be introduced directly into the slurry, it can be formed in situ in the slurry by the reaction of two or more materials, or it can be supplied in any manner whatsoever which will provide the slurry with the nitrogenous compound.

The terms "soluble salt of hydrazine," "soluble salt of hydroxylamine," or "soluble salt of a cyanide," as used herein, refer to any salt of hydrazine, hydroxylamine, or a cyanide, respectively, having a solubility in water in excess of about 0.1 grams per liter of water at 77°F.

Illustrative soluble salts of hydrazine include the acid hydrazine salts such as hydrazine mono-hydrochloride $N_2H_4 \cdot HCl$, hydrazine di-hydrochloride $N_2H_4 \cdot 2HCl$, hydrazine mono-nitrate $N_2H_4 \cdot HNO_3$, hydrazine di-nitrate $N_2H_4 \cdot 2HNO_3$, di-hydrazine sulfate $(N_2H_4)_2 \cdot H_2SO_4$ and mono-hydrazine sulfate $N_2H_4 \cdot H_2SO_4$.

Illustrative soluble salts of hydroxylamine include the acid hydroxylamine salts such as hydroxylamine hydrochloride $NH_2OH \cdot HCl$, hydroxylamine sulfate $(NH_2OH)_2 \cdot H_2SO_4$, hydroxylamine nitrate $NH_2OH \cdot HNO_3$ and hydroxylamine acetate $NH_2OH \cdot CH_3COOH$.

Illustrative soluble salts of a cyanide include the alkali metal cyanides such as sodium cyanide NaCN and potassium cyanide KCN, the ammonium cyanides such as ammonium cyanide $NH_4CN$ and alkaline earth cyanides such as calcium cyanide $Ca(CN)_2$, barium cyanide $Ba(CN)_2$ and strontium cyanide $Sr(CN)_2$.

Of course, two or more nitrogenous compounds can be added to the slurry if desired. The introduction of the compound into the slurry can be accomplished in any of a variety of known contacting vessels and equipment. Mixing is desirable and illustrative retention times of between about 30 seconds and 24 hours in the contacting vessel have been found to be effective.

The amount of nitrogenous compound added can vary widely depending upon a number of factors such as the nature of the compound and the stage in processing where the addition occurs. Illustratively, when the compound is hydrazine or a soluble salt of hydrazine, enough compound is introduced into the slurry to provide a hydrazine content, expressed as $N_2H_4$, of from about 0.01 to 10, and preferably from about 0.02 to 1, weight percent of the total weight of the slurry.

When the compound is hydroxylamine or a soluble salt of hydroxylamine, enough compound is illustratively introduced into the slurry to provide a hydroxylamine content, expressed as $NH_2OH$, of from about 0.01 to 10, and preferably from about 0.01 to 0.5, weight percent of the total weight of the slurry.

When the compound is hydrogen cyanide or a soluble salt of a cyanide, enough compound is illustratively introduced into the slurry to provide a cyanide content, expressed as HCN, of from about 0.005 to 5, and preferably from about 0.02 to 1, weight percent of the total weight of the slurry.

It is the presence of the nitrogenous compounds in the slurry which has been found to cause a larger fraction of the cobalt present in the slurry to enter the liquid phase as a solubilized form of cobalt thus facilitating its recovery.

The novel composition of this invention is produced upon the introduction of the nitrogenous compound into the slurry, and it may be defined as a slurry containing a solid phase illustratively comprising from about 5% to 60% by weight of the total slurry of finely divided, previously reduced ore and a liquid phase illustratively comprising an aqueous ammonical solution containing from about 1 to 160 grams of ammonium hydroxide, expressed as $NH_3$, per liter of solution and having a pH higher than 7. The composition is further characterized by the presence, in an amount sufficient to enhance the solubility of the cobalt values of the ore in the liquid phase of the slurry, of a nitrogenous compound selected from the group consisting of hydrazine, a soluble salt of hydrazine, hydroxylamine, a soluble salt of hydroxylamine, hydrogen cyanide and a soluble salt of a cyanide.

Illustratively, the hydrazine or hydroxylamine content of the composition, expressed as $N_2H_4$ or $NH_2OH$, respectively, is from about 0.01 to 10%, and preferably from about 0.02 to 1% hydrazine and 0.01 to 0.5% hydroxylamine, by total weight of slurry.

In the case of hydrogen cyanide or a soluble salt of a cyanide, the cyanide content of the composition, expressed as HCN, ranges from about 0.005 to 5%, and preferably from about 0.02 to 1%, by total weight of the slurry.

The slurry composition illustratively has a cobalt content of from about 0.001 to 1% by total weight of slurry and a nickel content, on the same basis of from 0 to about 15%. The normal cobalt and nickel content of such slurries is in the range of about 0.01–0.1% and 0.1–3%, respectively. The aqueous ammoniacal liquid phase may also optionally contain other components such as ammonium carbonate or dissolved metals. As known to the prior art, slurries produced during the process of ammoniacally leaching reduced cobalt-containing ores in the presence of oxygen do not contain the nitrogenous compounds used in this invention. In contrast, the novel compositions of this invention contain such compounds which impart a highly beneficial and unexpected improvement in the amount of valuable cobalt recoverable from an ammoniacal leaching process.

The selection of treatment temperatures is not a critical parameter in the practice of the invention. Illustrative temperatures range from about 50°F. to 200°F. The addition of nitrogenous compound to the slurry may be carried out at any point in the leaching or washing circuit of the process. The introduction of the compound is preferably conducted after the leaching operation has been completed and at some stage during the washing operations. Agitation is preferred to provide uniform distribution of the compound throughout the slurry. The improvement in the transfer of cobalt from the solid phase to the liquid phase of the slurry occurs almost immediately upon introduction of the nitrogenous compound, with further improvement taking place with time. Illustrative contact times of from about 30 seconds to 24 hours, and preferably from about 1 minute to 3 hours, are normally allowed before subjecting the slurry to further processing.

Many modifications and applications of the concept of the present invention will be apparent to those skilled in the art. Illustratively, one such modification involves the application of the invention to the process shown schematically in the accompanying drawing. In this process, ground nickeliferous ore containing cobalt 1 is fed to a furnace 2 where it is reduced at a temperature between 800°F. and 2,000°F. with conventional reducing gases 3, such as, for example, producer gas. The reduced ore 4 passes to an indirect cooler 5 where it is cooled to a temperature between 100°F. and 500°F. The cooled ore 6 is fed to a mixing vessel 7 where it is contacted with quench liquor 8 to form a slurry. This quench liquor is the overflow from thickener 14 as discussed more fully hereinbelow. The quenched ore slurry 9 is then passed through a series of aerators 10 where it is contacted with air 11. The resulting aerated slurry 12 has about 15% solids by weight. This slurry 12 is then fed to thickener 13 where it is thickened to produce an underflow 18 containing about 30% solids by weight.

The thickened underflow 18 from thickener 13 is then subjected to a counter-current washing procedure in four additional thickeners 14, 15, 16 and 17. The overflow 33 from thickener 13 represents product liquor containing dissolved nickel and cobalt. These metals are recovered from the product liquor by various methods known to the art.

The underflow 18 from thickener 13 is blended with the overflow 22 from thickener 15 and fed to thickener 14 where it is thickened to about 50% solids by weight. The overflow of thickener 14 is used as the quench liquor 8, and the underflow 19 is blended with the overflow 23 from thickener 16 and fed to thickener 15. The underflow 20 from thickener 15 is blended with the overflow 24 from thickener 17 and fed to thickener 16. An aqueous solution 26 containing ammonium hydroxide and ammonium carbonate is used as the washing medium for the process. Thus, the underflow 21 from thickener 16 is blended with the washing solution 26 before passing to the final thickener 17 of the circuit. The present invention is conveniently practiced at this point by injecting the nitrogenous compound 27 into washing solution 26, blending the treated washing solution 28 with the underflow 21 from thickener 16 and allowing for some contact time in mixing vessel 29 before passing the treated slurry 30 to thickener 17. As shown in the drawing, underflow 18 of thickener 13 is subjected to counter-current washing with the underflow from each thickener being washed with the overflow from a following thickener. Stream 32 represents the leached ore tailings of the process.

The present invention may be conveniently practiced at any point within the leaching-washing circuit of the ammoniacal leaching process of the type previously described. Thus, the additives may be blended with the quench liquor 8 or with the washing solution 26 or they may be injected directly into the slurry immediately after quenching, or directly into any of the underflow streams of the washing operations. For example, the leached ore tailings of the process 32 may be treated by the method of this invention by introducing the desired nitrogenous compound into the slurry of tailings and further processing the treated tailings to separate and recover the solubilized cobalt by methods known to the art. The manner or techniques used to introduce the compounds are not critical, but should provide for intimate contact between the solid phase of the slurry being processed and the solution containing the compound.

The flow scheme of the accompanying drawings represents but one of the various modifications of the process to which the concept of the present invention is applicable. The basic aspects of such a process entail a high-temperature reduction of a cobalt-containing ore, followed by a leaching step in which the reduced ore is treated with an ammoniacal solution in the presence of oxygen and then a washing step. Modifications in the number of aerators, the number of thickeners and their location in the washing circuit, pertinent flow rates and the like will be apparent to those skilled in the art.

Although the present invention may be practiced at any point within the leaching or washing circuit of an ammoniacal leaching process of the type previously described, the method of the present invention is preferably applied immediately before the last stage of the leaching-washing circuit by introducing the desired nitrogenous compound into the washing solution 26 and blending the treated washing solution 28 with the feed 21 to the last thickener 17 in a mixing vessel 29 as indicated in the drawing. Hydrogen cyanide is a preferred nitrogenous compound and is introduced into the washing solution 26 in an amount sufficient to provide from about 0.02 to 1 grams of HCN per 100 grams of slurry 21 being processed. Thus, in the drawing, hydrogen cyanide 27 is injected into the washing solution 26 which, in turn, is blended with the underflow 21 from thickener 16 in vessel 29. The retention time in vessel 29 is preferably between 1 minute and 3 hours.

The following examples are provided to further illustrate the invention.

EXAMPLE 1

An ammoniacal slurry from an ammoniacal leaching process of the type previously described was employed in this example. The slurry contained 15% by weight of previously reduced cobalt-containing ore. The liquid phase of the slurry had a pH of about 10, a free ammonium hydroxide content equivalent to 20 grams of $NH_3$ per liter, and an ammonium carbonate content of 140 grams of $(NH_4)_2CO_3$ per liter. The cobalt content of the liquid phase was 0.284 grams per liter, and the cobalt content of the solid phase was 0.085% by weight; the nickel content of the liquid phase was 8.89 grams per liter, and the nickel content of the solid phase was 0.28% by weight.

In Test A of this example, a 500 ml sample of this ammoniacal slurry was used as a control. The sample was shaken vigorously for one hour in a closed container at 77°F. The slurry was then analyzed. No appreciable change resulted in the cobalt and nickel contents of either the liquid or the solid phase of the slurry.

In Test B of this example, a 500 ml sample of this same ammoniacal slurry was treated with hydrazine $N_2H_4$ in an amount equal to 0.09 grams of $N_2H_4$ per 100 grams of slurry, and the sample was shaken vigorously for one hour in a closed container at 77°F. The slurry was then analyzed. The cobalt content of the liquid phase increased to 0.332 grams per liter, and the cobalt content of the solid phase decreased to 0.050% by weight. The nickel content of the liquid phase was 8.85 grams per liter, and that of the solid phase was 0.30% by weight. This represents an increase in the dissolution of the cobalt values from the solid phase of 41% (0.085% by weight without $N_2H_4$ vs. 0.050% by weight with $N_2H_4$), and an increase in the total amount of solubilized, and thus potentially recoverable, cobalt of 20% (0.332 grams per liter with $N_2H_4$ vs. 0.284 grams per liter without $N_2H_4$), as compared to Test A.

In Test C of this example, a 500 ml sample of the same ammoniacal slurry was treated with hydroxylamine hydrochloride $NH_2OH \cdot HCl$ in an amount equivalent to 0.046 grams of $NH_2OH$ per 100 grams of slurry, and the sample was shaken vigorously for one hour in a closed container at 77°F. The slurry was then analyzed. The cobalt content of the liquid phase increased to 0.330 grams per liter, and the cobalt content of the solid phase decreased to 0.060% by weight. The nickel content of the liquid phase was 8.84 grams per liter, and that of the solid phase was 0.30% by weight. This represents an increase in the dissolution of the cobalt values from the solid phase of 29% (0.085% by weight without $NH_2OH \cdot HCl$ vs. 0.060% by weight with $NH_2OH \cdot HCl$), and an increase in the total amount of solubilized, and thus potentially recoverable, cobalt of 16% (0.330 grams per liter with $NH_2OH \cdot HCl$ vs. 0.284 grams per liter without $NH_2OH \cdot HCl$), as compared to Test A.

These data show that the solubilization of cobalt was greatly improved in Test B, where hydrazine was used, and in Test C, where hydroxylamine hydrochloride was used, in comparison with control Test A, where no additive was used. Nickel solubilization, on the other hand, was not adversely affected.

EXAMPLE 2

An ammoniacal slurry similar to that described in Example 1 was employed in ths example. The slurry contained about 15% by weight of previously reduced cobalt-containing ore. The liquid phase of the slurry had a pH of about 10, a free ammonium hydroxide content equivalent to 20 grams of $NH_3$ per liter, and an ammonium carbonate content of 140 grams of $(NH_4)_2CO_3$ per liter. The cobalt content of the liquid phase was 0.154 grams per liter, and the cobalt content of the solid phase was 0.070% by weight; the nickel content of the liquid phase was 7.47 grams per liter, and the nickel content of the solid phase was 0.38% by weight.

In Test A of this example, a 500 ml sample of this slurry was used as a control. The sample was shaken for one hour in a closed container at 77°F. The slurry was then analyzed. No appreciable change resulted in the cobalt and nickel contents of either the liquid or the solid phase of the slurry.

In Test B of this example, a 500 ml sample of this same slurry was treated with sodium cyanide NaCN in an amount equivalent to 0.05 grams of HCN per 100 grams of slurry, and the sample was shaken for one hour in a closed container at 77°F. The slurry was then analyzed. The cobalt content of the liquid phase increased to 0.207 grams per liter, and the cobalt content of the solid phase decreased to 0.034% by weight. The nickel content of the liquid phase was 7.39 grams per liter, and that of the solid phase was 0.39% by weight. This represents an increase in the dissolution of the cobalt values from the solid phase of 51% (0.070% by weight without NaCN vs. 0.034% by weight with NaCN), and an increase in the amount of solubilized, and thus potentially recoverable, cobalt of 34% (0.207 grams per liter with NaCN vs. 0.154 grams per liter without NaCN), as compared to Test A. While the nickel content of both the liquid and solid phase of the treated and untreated slurry remained approximately unchanged, the solubilization of cobalt was vastly improved when the slurry was treated with sodium cyanide in accordance with this invention.

EXAMPLE 3

An ammoniacal slurry from an ammoniacal leaching process was employed in this example. The slurry contained about 50% by weight of previously reduced cobalt-containing ore. The liquid phase of this slurry had a pH of about 10, a free ammonium hydroxide content equivalent to 20 grams of $NH_3$ per liter, and an ammonium carbonate content of 140 grams of $(NH_4)_2CO_3$ per liter. The cobalt content of the liquid phase was 0.009 grams per liter, and that of the solid phase was 0.078% by weight; the nickel content of the liquid phase was 0.30 grams per liter, and that of the solid phase was 0.29% by weight.

In Test A of this example, a 500 ml sample of this slurry was used as a control. The sample was shaken for one hour in a closed container at 77°F. The slurry was then analyzed. No appreciable change resulted in the cobalt and nickel contents of either the liquid or the solid phase of the slurry.

In Test B of this example, a 500 ml sample of this slurry was treated with hydrogen cyanide HCN in an amount equivalent to 0.03 grams of HCN per 100 grams of slurry, and the sample was shaken for one hour in a closed container at 77°F. The slurry was then analyzed. The cobalt content of the liquid phase increased to 0.102 grams per liter, and that of the solid phase was 0.29% by weight. This represents an increase in the dissolution of cobalt values from the solid phase of 15% (0.078% by weight without HCN vs. 0.066% by weight with HCN), and an increase in the total amount of solubilized, and thus potentially recoverable, cobalt of more than 1,000% (0.102 grams per liter with HCN vs. 0.009 grams per liter without HCN), as compared with Test A.

Here again, the solubilization of cobalt was considerably improved by the method of the present invention, while the solubilization of nickel was hardly affected.

The above examples and other specific or detailed information set forth above is illustrative only and such modifications or alterations thereof as would be apparent to one skilled in the art are deemed to fall within the spirit and scope of the claims appended hereto.

What is claimed is:

1. In a reduced ammoniacal leaching process for the recovery of nickel and cobalt values from an ore which comprises treating a slurry consisting of (a) a solid phase comprising a reduced cobalt containing ore and (b) a liquid phase comprising an aqueous ammoniacal solution having a pH above 7, with a gas containing elemental oxygen in at least one leaching stage to solubilize nickel and cobalt values of the ore in the liquid phase of the slurry, and then washing the slurry with an ammoniacal washing solution in at least one washing stage, without passing a gas containing elemental oxygen through the slurry during the washing stage, to recover a product liquor containing the solubilized nickel and cobalt values:

the improvement for enhancing the solubility of the cobalt values of the ore in the liquid phase of the slurry which comprises providing in the slurry, during the washing stage, a nitrogenous compound selected from the group consisting of hydrazine and a soluble salt of hydrazine, wherein the amount of the compound in the slurry is sufficient to provide a hydrazine content, expressed as $N_2H_4$, of from about 0.01 to 10% of the total weight of slurry.

2. In a reduced ammoniacal leaching process for the recovery of nickel and cobalt values from an ore which comprises treating a slurry consisting of (a) a solid phase comprising a reduced cobalt containing ore and (b) a liquid phase comprising an aqueous ammoniacal solution having a pH above 7, with a gas containing elemental oxygen in at least one leaching stage to solubilize nickel and cobalt values of the ore in the liquid phase of the slurry, and then washing the slurry with an ammoniacal washing solution in at least one washing stage, without passing a gas containing elemental oxygen through the slurry during the washing stage, to recover a product liquor containing the solubilized nickel and cobalt values:

the improvement for enhancing the solubility of the cobalt values of the ore in the liquid phase of the slurry which comprises providing in the slurry, during the washing stage, a nitrogenous compound selected from the group consisting of hydroxylamine and a soluble salt of hydroxylamine, wherein the amount of compound in the slurry is sufficient to provide a hydroxylamine content, expressed as $NH_2OH$, of from about 0.01 to 10% of the total weight of slurry.

3. In a reduced ammoniacal leaching process for the recovery of nickel and cobalt values from an ore which comprises treating a slurry consisting of (a) a solid phase comprising a reduced cobalt containing ore and (b) a liquid phase comprising an aqueous ammoniacal solution having a pH above 7, with a gas containing elemental oxygen in at least one leaching stage to solubilize nickel and cobalt values of the ore in the liquid phase of the slurry, and then washing the slurry with an ammoniacal washing solution in at least one washing stage, without passing a gas containing elemental oxygen through the slurry during the washing stage, to recover a product liquor containing the solubilized nickel and cobalt values:

the improvement for enhancing the solubility of the cobalt values of the ore in the liquid phase of the slurry which comprises providing in the slurry, during the washing stage, a nitrogenous compound selected from the group consisting of hydrazine and a soluble salt of hydrazine, said compound being provided in an amount effective to enhance the solubility of the cobalt values of the ore in the liquid phase of the slurry, without subjecting the slurry to a reductive carbonylation.

4. In a reduced ammoniacal leaching process for the recovery of nickel and cobalt values from an ore which comprises treating a slurry consisting of (a) a solid phase comprising a reduced cobalt containing ore and (b) a liquid phase comprising an aqueous ammoniacal solution having a pH above 7, with a gas containing elemental oxygen in at least one leaching stage to solubilize nickel and cobalt values of the ore in the liquid phase of the slurry, and then washing the slurry with an ammoniacal washing solution in at least one washing stage, withhout passing a gas containing elemental oxygen through the slurry during the washing stage, to recover a product liquor containing the solubilized nickel and cobalt values:

the improvement for enhancing the solubility of the cobalt values of the ore in the liquid phase of the slurry which comprises providing in the slurry, during the washing stage, a nitrogenous compound selected from the group consisting of hydroxylamine and a soluble salt of hydroxylamine, said compound being provided in an amount effective to enhance the solubility of the cobalt values of the ore in the liquid phase of the slurry, without subjecting the slurry to a reductive carbonylation.

5. In a reduced ammoniacal leaching process for the recovery of nickel and cobalt values from an ore which comprises treating a slurry consisting of (a) a solid phase comprising a reduced cobalt containing ore and (b) a liquid phase comprising an aqueous ammoniacal solution having a pH above 7, with a gas containing elemental oxygen in at least one leaching stage to solubilize nickel and cobalt values of the ore in the liquid phase of the slurry, and then washing the slurry with an ammoniacal washing solution in at least one washing stage, without passing a gas containing elemental oxygen through the slurry during the washing stage, to recover a product liquor containing the solubilized nickel and cobalt values:

the improvement for enhancing the solubility of the cobalt values of the ore in the liquid phase of the slurry which comprises providing in the slurry, during the washing stage, a nitrogenous compound selected from the group consisting of hydrazine and a soluble salt of hydrazine, said compound being provided in an amount effective to enhance the solubility of the cobalt values of the ore in the liquid phase of the slurry.

6. The process of claim 5 wherein the washing step employs a plurality of countercurrent washing stages to counter-currently wash the slurry wherein the ammoniacal washing solution is first fed to the final washing stage, in which the nitrogenous compound is provided in the slurry by adding the compound to the ammoniacal washing solution.

7. In a reduced ammoniacal leaching process for the recovery of nickel and cobalt values from an ore which comprises treating a slurry consisting of (a) a solid phase comprising a reduced cobalt containing ore and (b) a liquid phase comprising an aqueous ammoniacal solution having a pH above 7, with a gas containing elemental oxygen in at least one leaching stage to solubilize nickel and cobalt values of the ore in the liquid phase of the slurry, and then washing the slurry with an ammoniacal washing solution in at least one washing stage, without passing a gas containing elemental oxygen through the slurry during the washing stage, to recover a product liquor containing the solubilized nickel and cobalt values:

the improvement for enhancing the solubility of the cobalt values of the ore in the liquid phase of the slurry which comprises providing in the slurry, during the washing stage, a nitrogenous compound selected from the group consisting of hydroxylamine and a soluble salt of hydroxylamine, said compound being provided in an amount effective to enhance the solubility of the cobalt values of the ore in the liquid phase of the slurry.

8. The process of claim 7 wherein the washing step employs a plurality of countercurrent washing stages to counter-currently wash the slurry wherein the ammoniacal washing solution is first fed to the final washing stage, in which the nitrogenous compound is provided in the slurry by adding the compound to the ammoniacal washing solution.

* * * * *

UNITED STATES PATENT OFFICE
CERTIFICATE OF CORRECTION

PATENT NO. : 3,888,966
DATED : June 10, 1975
INVENTOR(S) : David James Miller

It is certified that error appears in the above-identified patent and that said Letters Patent are hereby corrected as shown below:

Column 8, line 4, "ths" should be -- this --;

Column 9, line 21, "an" should be -- a reduced --;

Column 9, line 45, "an" should be -- a reduced --;

Column 10, line 2, "an" should be -- a reduced --;

Column 10, line 25, "an" should be -- a reduced --;

Column 10, line 50, "an" should be -- a reduced --;

Column 11, line 13, "an" should be -- a reduced --.

Signed and Sealed this fourteenth Day of October 1975

[SEAL]

Attest:

RUTH C. MASON
Attesting Officer

C. MARSHALL DANN
Commissioner of Patents and Trademarks